United States Patent
Schaefer et al.

(10) Patent No.: US 10,920,079 B2
(45) Date of Patent: Feb. 16, 2021

(54) MIXTURES CONTAINING PLASTIC AND ORGANIC FIBRES

(71) Applicant: Wacker Chemie AG, Munich (DE)

(72) Inventors: Oliver Schaefer, Burghausen (DE); Peter Randel, Altusried (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/768,354

(22) PCT Filed: Oct. 25, 2016

(86) PCT No.: PCT/EP2016/075613
§ 371 (c)(1),
(2) Date: Apr. 13, 2018

(87) PCT Pub. No.: WO2017/072096
PCT Pub. Date: May 4, 2017

(65) Prior Publication Data
US 2018/0312695 A1 Nov. 1, 2018

(30) Foreign Application Priority Data
Oct. 30, 2015 (DE) .......... 10 2015 221 364

(51) Int. Cl.
*C08L 97/02* (2006.01)
*C08G 18/61* (2006.01)
*C08G 77/458* (2006.01)

(52) U.S. Cl.
CPC .............. *C08L 97/02* (2013.01); *C08G 18/61* (2013.01); *C08G 77/458* (2013.01)

(58) Field of Classification Search
CPC ....... C08L 97/02; C08G 18/61; C08G 77/458; C08G 77/452; C08G 77/445; C08G 77/455; C08G 77/42
See application file for complete search history.

(56) References Cited

U.S. PATENT DOCUMENTS

| | | |
|---|---|---|
| 2003/0176613 A1 | 9/2003 | Hohberg et al. |
| 2004/0210024 A1 | 10/2004 | Schafer et al. |
| 2004/0254268 A1 | 12/2004 | Cernohous et al. |
| 2004/0254325 A1 | 12/2004 | Kuepfer et al. |
| 2006/0100340 A1* | 5/2006 | Gao ............ C09D 15/00 524/475 |
| 2008/0318065 A1* | 12/2008 | Sherman ........... C08L 23/06 428/446 |
| 2011/0009572 A1* | 1/2011 | Schaefer .......... C08L 75/02 525/452 |
| 2013/0022807 A1* | 1/2013 | Chorvath ........... C08G 18/61 428/221 |
| 2014/0275355 A1* | 9/2014 | Cernohous ......... C08L 23/06 524/35 |
| 2015/0175786 A1 | 6/2015 | Duchesne et al. |

FOREIGN PATENT DOCUMENTS

| | | | |
|---|---|---|---|
| CN | 104685001 A | 6/2015 | |
| DE | 10137855 A1 | 2/2003 | |
| EP | 0250248 A2 | 12/1987 | |
| EP | 0822951 B1 | 9/2002 | |
| EP | 1489129 A1 | 12/2004 | |
| JP | 2003247173 A | 9/2003 | |
| JP | 2007502355 A | 2/2007 | |
| JP | 2015063607 A | 4/2015 | |
| WO | WO-2008088733 A2 * | 7/2008 | ............ C08G 18/10 |
| WO | WO-2013188076 A1 * | 12/2013 | ............ C08L 23/06 |

OTHER PUBLICATIONS

SciFinder Scholar entry for CAS Registry No. 1309649-67-9—silicone rubber, polyurea, two pages, accessed on Jul. 31, 2019.*
English-language machine translation of JP2015063607, performed on Espacenet on Feb. 4, 2020.*
Hans-Georg Elias & Rolf Mulhaupt, "Plastics, General Survey, 3. Supermolecular Structures," in Ullmann's Encyclopedia of Industrial Chemistry, 17 pages, published online 2015.*
Velichko Hristov, John Vlachopoulos, Advances in Polymer Technology, vol. 26, No. 2, p. 100-108, Jun. 7, 2007, Canada.
Velichko Hristov et al, "Thermoplastic Silicone Elastomer Lubricant in Extrusion of Polypropylene Wood Flour Composites", Advances in Polymer Technology, vol. 26, Issue 2, pp. 100-108.
Properties and Quantitative Characterization for Polymer Composites_ and_English_Abstract, ISBN 978-7-5623-41-5-5, (2013) 4 pages.

* cited by examiner

*Primary Examiner* — Nicholas E Hill
(74) *Attorney, Agent, or Firm* — Brooks Kushman P.C.

(57) ABSTRACT

Polysiloxane/polymer copolymers are used in conjunction with conventional polymer binders for production of wood fiber composites, and improve processing characteristics as well as end product properties.

15 Claims, No Drawings

MIXTURES CONTAINING PLASTIC AND ORGANIC FIBRES

CROSS REFERENCE TO RELATED APPLICATIONS

This application is the U.S. National Phase of PCT Appln. No. PCT/EP2016/075613 filed Oct. 25, 2016, which claims priority to German Application No. 10 2015 221 364.1 filed Oct. 30, 2015, the disclosures of which are incorporated in their entirety by reference herein.

BACKGROUND OF THE INVENTION

1. Field of the Invention

The invention relates to fiber-filled mixtures containing siloxane-organo copolymers, to processes for the production thereof, and to the use thereof.

2. Description of the Related Art

The use of wood as a traditional material of construction is associated with substantial disadvantages, for example that the resistance to UV light and moisture is limited and that the material has a propensity for splintering at the surface, especially after weathering. As a replacement, so-called WPC (wood polymer composite) have found increasing use as wood replacement products in recent years. These WPCs are wood- or natural fiber-reinforced plastics which may contain additional additives to avoid the disadvantages of wood with regard to UV protection and moisture and also to ensure a wood-like appearance. Such products are known for example as architectural elements or as a patio covering in the form of so-called "decking." The wood fiber fraction is typically between 10% to 90%, preferably between 30% to 80%, and the remaining fraction consists essentially of plastic, usually polyvinyl chloride (PVC) or polymers from the group of polyolefins, such as high-density polyethylene (HDPE) or polypropylene (PP) which may additionally be admixed with additives commonly used in plastics processing. These additives may be dyes and pigments, UV stabilizers, and flame retardants, in order that outdoor use may be ensured over many years and fire resistance may be enhanced so that these profiles may also be employed in the construction sector. Additives against attack by bacteria, insects, fungi, in particular mildew, algae or termites etc. may likewise be incorporated into the WPC.

WPC may either be produced directly as a semifinished product, for example as a profile, or as a plastics ganulate which may be subjected to forming in further processing steps, for example extrusion or injection molding.

Natural fiber-/wood fiber-plastics mixtures are produced on typical plastics processing machines, for example twin-screw extruders or planetary gear extruders which are intended to ensure good mixing of the wood fibers with the plastic. Since the mechanical characteristics, for example stiffness and flexural strength, of the thus produced compounds continually increase and these compounds look increasingly similar to wood with increasing fiber fraction, the WPC producer aims to maximize the content of wood fibers. However, the disadvantage of this is that at higher fiber contents internal friction continually increases, thus both impeding processing and intensifying wear on the mixing apparatuses. To avoid the increasingly occurring processing problems at higher fiber contents, so-called polymer processing aids (PPA), for example zinc stearates, are employed. These act as internal and external lubricants and facilitate the mixing and processing process and can also result in more homogeneous, more uniform surfaces of the extruded semifinished products.

However, the disadvantage of currently used PPA's is their known tendency in some cases to become adsorbed on filler surfaces present and thus to become inactivated. This occurs in particular at the fiber surfaces present due to the high wood fiber material content, as a result of which very high concentrations of PPAs must be added in some cases. Thus between 2% and up to 6% by weight of PPA are added which in these high concentrations, however, in turn have a negative impact on the stiffness of the WPC blends. In addition, the weldability of the thus extruded profiles is reduced which is a disadvantageous especially in the production of window frames made of WPC. Furthermore the PPAs employed also react with other polymer additives, so-called couplers/adhesion promoters, which, by the means of reactive groups, are intended to bring about better adhesion of the wood fibers to the employed matrix plastic and thus improve the mechanical properties of the WPC. These side reactions of the PPAs thus also necessarily result in an undesired impairment of the mechanical properties of the WPCs.

Also known are studies by von Hristov et al, who used special thermoplastic silicones as process additives in WPC (Advances in Polymer Technology, Vol. 26, No. 2, 100-108 (2007)). However, the disadvantage apparent here is that the products used by Hristov were used in relatively large amounts and thus resulted not only in the desired positive effects on processing properties but also in some cases in impairment of the mechanical properties of the WPC compound.

EP 1 489 129 A1 discloses organopolysiloxane/polyurea/poly-urethane block copolymers and the use thereof for a broad spectrum of use, and inter alia, also the use thereof as an addition in polymer blends.

It is an object of the present invention to find a process additive which allows the production of WPCs by mixing of plastics with natural and wood fibers, such that on the one hand high fiber amounts may be incorporated into the plastic, while on the other hand, the mechanical properties of the WPC compound are not noticeably impaired or are even improved by the process additive and the disadvantages of the prior art are no longer apparent. This was achieved by the present invention.

SUMMARY OF THE INVENTION

The invention thus provides mixtures containing
(A) amorphous siloxane-organo copolymers having 10 to 3000 siloxane units per siloxane segment and at least one organo segment having at least one group selected from ester groups, amide groups, urethane groups, urea groups and thiourea groups,
(B) organic fibers and
(C) optionally substituted polyolefins.

DETAILED DESCRIPTION OF THE PREFERRED EMBODIMENTS

The organic segments in the copolymers (A) are preferably urea-, urethane- or amide-containing segments and more preferably urea-containing segments.

In the copolymers (A) employed in accordance with the invention, the siloxane segments and the organo segments may be distributed in any desired fashion, for example randomly. Component (A) is preferably selected from block or comb polymers, more preferably block copolymers.

The term "amorphous siloxane-organo copolymers" is a term known to those skilled in the art. In the context of the invention, the term "amorphous siloxane-organo copolymers" is preferably to be understood as meaning siloxane-organo copolymers which, in studies by differential scanning calorimetry (DSC) at a pressure of 1013 hPa in the temperature range between 20° C. and 200° C., show no melting enthalpies of crystalline fractions.

Component (A) is preferably selected from amorphous siloxane-organo copolymers of general formula (1)

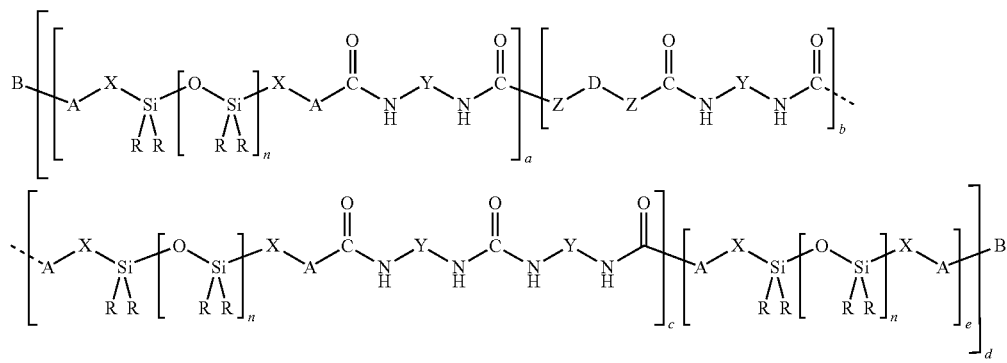

wherein
R may be identical or different and represents a monovalent, SiC-bonded, optionally fluorine- or chlorine-substituted hydrocarbon radical having 1 to 20 carbon atoms,
X may be identical or different and represents an alkylene radical having 1 to 20 carbon atoms in which nonadjacent methylene units may be replaced by —O— groups,
A may be identical or different and represents oxygen atom, sulfur atom or an amino group —NR'—,
Z may be identical or different and represents an oxygen atom or an amino group —NR'—,
R' may be identical or different and represents hydrogen or an alkyl radical having 1 to 10 carbon atoms,
Y may be identical or different and represents a divalent, optionally fluorine- or chlorine-substituted hydrocarbon radical having 1 to 20 carbon atoms,
D may be identical or different and represents a divalent, optionally fluorine-, chlorine- or $C_1$-$C_6$-alkyl-ester-substituted hydrocarbon radical in which nonadjacent methylene units may be replaced by —O—, —COO—, —OCO— or —OCOO— groups,
B may be identical or different and represents hydrogen or a functional or nonfunctional organic or organosilicon radical,
n may be identical or different and is a number from 10 to 3000,
a is a number of at least 1,
b is 0 or a number from 1 to 100,
c is 0 or a number from 1 to 100,
d is a number of at least 1 and
e is a number of 0 or 1.

Examples of R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecylrest; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m-, p-tolyl radicals, xylyl radicals, and ethylphenyl radicals; or aralkyl radicals such as the benzyl radical or the α- and the β-phenyl-ethyl radical.

Examples of halogenated radicals R are halogen alkyl radicals such as the 3,3,3-trifluoro-n-propyl radical, the 2,2,2,2',2',2'-hexafluoroisopropyl radical and the heptafluoroisopropyl radical.

Radical R is preferably a monovalent, optionally fluorine- and/or chlorine-substituted hydrocarbon radical having 1 to 20 carbon atoms, more preferably a hydrocarbon radical having 1 to 6 carbon atoms, and in particular a methyl, ethyl, vinyl or phenyl radical.

Examples of radical X are the alkylene radicals listed hereinbelow for radical Y. Radical X is preferably an alkylene radical having 1 to 10 carbon atoms, more preferably a methylene or n-propylene radical.

Radical R' is preferably hydrogen.

A preferably represents an —NR'— radical where R' is as defined above, more preferably an —NH— radical.

Radical Z preferably represents —O— or —NH—.

Examples of radical Y are alkylene radicals such as the methylene, ethylene, n-propylene, isopropylene, n-butylene, isobutylene, tert-butylene, n-pentylene, isopentylene, neopentylene, and tert-pentylene radicals, hexylene radicals, heptylene radicals, octylene radicals, nonylene radicals, decylene radicals, dodecylene radicals or octadecylene radicals; cycloalkylene radicals such as cyclopentylene, 1,4-cyclohexylene, isophoronylene or 4,4'-methylenedicyclohexylene radicals; alkenylene radicals such as the vinylene, n-hexenylene, cyclohexenylene, 1-propenylene, allylene, butenylene or 4-pentenylene radicals; alkynylene radicals such as the ethynylene or propargylene radical; arylene radicals such as the phenylene, bisphenylene, naphthylene, anthrylene or phenanthrylene radicals; alkarylene radicals such as o-, m-, p-tolylene radicals, xylylene radicals or ethylphenylene radicals; or aralkylene radicals such as the benzylene radical, the 4,4'-methylenediphenylene radical or the β-phenylethylene radical.

Radical Y is preferably a hydrocarbon radical having 3 to 13 carbon atoms, more preferably linear or cyclic alkylene radicals.

Examples of radicals D are the examples listed for Y and also polyoxyalkylene radicals, such as polyoxyethylene radicals or polyoxypropylene radicals.

D preferably represents a divalent, optionally fluorine-, chlorine- or $C_1$-$C_6$-alkyl-ester-substituted hydrocarbon radical having 1 to 700 carbon atoms or a polyoxyalkylene radical. In the case where D is an optionally substituted hydrocarbon radical, it is preferably selected from alkylene radicals having 2 to 12 carbon atoms, more preferably 4 to 12 carbon atoms. In the case where D is polyoxyalkylene radical it is preferably selected from those having 20 to 800 carbon atoms, more preferably 20 to 200 carbon atoms, and in particular 20 to 100 carbon atoms, wherein it is most preferably selected from polyoxyethylene radicals or polyoxypropylene radicals.

Index n preferably represents a number from 10 to 800, more preferably 10 to 400, and in particular 40 to 300.

a preferably represents a number from 1 to 1000, more preferably from 3 to 250, and in particular from 5 to 100.

When b is not 0, b preferably represents a number from 1 to 250, in particular 1 to 30. Preferably, b is 0.

Index c preferably denotes 0 or a number from 1 to 10, in particular 0 or a number from 1 to 5.

d preferably represents a number from 1 to 30, more particularly preferably from 1 to 20, and in particular from 1 to 10.

End groups B in formula (1) may be customary prior art end groups formed standardly in the synthesis of such polymers, for example hydrogen, amino or isocyanate end groups. These may be reacted with further groups during the polymer synthesis or subsequently, for example with aliphatic amines, alcohols or else aminosilanes or isocyanatosilanes. It is also possible even during the synthesis to add monofunctional organic compounds reactive toward isocyanate groups, for example primary or secondary alcohols or amines, thus making it possible to elegantly control also the rheological properties and the molecular weight of the siloxane-organo copolymers (A).

Further preferred examples of B are structures of general formulae $$(R'O)_f R''_{3-f} Si \overset{X}{\diagdown} \underset{H}{N} \overset{O}{\diagup} \cdots , \quad (2)$$

$$OCN \overset{Y}{\diagdown} \underset{H}{N} \overset{O}{\diagup} \cdots \text{ and} \quad (3)$$

$$R'' \overset{O}{\diagup} \underset{A}{\diagdown} \underset{H}{N} \overset{Y}{\diagdown} \underset{H}{N} \overset{O}{\diagup} \cdots , \quad (4)$$

wherein

X may be identical or different and represents an alkylene radical having 1 to 20 carbon atoms in which nonadjacent methylene units may be replaced —O— groups, A may be identical or different and represents oxygen atom, sulfur atom or an amino group —NR'—, R' may be identical or different and represents hydrogen or an alkyl radical having 1 to 10 carbon atoms, R" may be identical or different and represents hydrogen or an alkyl radical having 1 to 20 carbon atoms, Y may be identical or different and represents a divalent, optionally fluorine- or chlorine-substituted hydrocarbon radical having 1 to 20 carbon atoms and f is 0, 1, 2 or 3.

Radical B is preferably selected from structures of general formulae (3) or (4) or hydrogen.

Component (A) is preferably colorless.

Component (A) is preferably selected from thermoplastic amorphous copolymers, particularly preferably from those where the temperature at which the loss factor (G"/G') assumes the value 1 is preferably not more than 40° K, more preferably not more than 20° K, below the processing temperature of the composition according to the invention.

The loss factor of the component (A) at the temperature of the melt of the composition according to the invention during the mixing process is preferably below 5, more preferably below 3, and most preferably below 2. This ensures that the component (A) still forms an elastic film on the plant parts, for example the nozzle surface, thus affording a particular effectiveness here.

This loss factor is described in DIN EN ISO 6721-1:2011. Determination of the loss factor is performed according to DIN EN ISO 6721-2:2008 including applicable accompanying documents. The loss factor is determined at a frequency of 1 Hz and in a temperature range from 20° C. to 250° C. using the standard test specimens of section 6.2 of DIN EN ISO 6721-2:2008. The loss factor may alternatively also be determined by means of ISO 6721-10 including applicable accompanying documents at a frequency of 1 Hz and a deformation of below 1%.

Copolymers of formula (1) employed according to the invention are already known and are preferably produced by prior art processes as described in EP-A 250248, EP-A 822951 or DE-A 10137855 for example, more preferably as described in DE-A 10137855.

In the component (A) employed according to the invention the content of diorganylsiloxy units is preferably between 80% and 99% by weight, more preferably between 90% and 99% by weight, and most preferably between 95% and 99% by weight.

Examples of siloxane-organo copolymers (A) of formula (1) are $(C_2H_5O)_3$—Si—$C_3H_6$—NH—CO—[NH—$(CH_2)_3$—Si$(CH_3)_2$—(O—Si$(CH_3)_2)_{35-45}$—$(CH_2)_3$—NH—CO—NH-p-$C_6H_{10}$—$CH_2$-p-$C_6H_{10}$—NH—CO$]_{40-70}$—NH$(CH_2)_3$SiMe$_2$(OSiMe$_2)_{35-45}$-$(CH_2)_3$—NH—CO—NH—$C_3H_6$—Si(OC$_2$H$_5)_3$, $(H_3CO)_3$—Si—$C_3H_6$—NH—CO—[NH—$(CH_2)_3$—Si$(CH_3)_2$—(O—Si$(CH_3)_2)_{35-45}$—$(CH_2)_3$—NH—CO—NH-p-$C_6H_{10}$—$CH_2$-p-$C_6H_{10}$—NH—CO$]_{40-70}$—NH$(CH_2)_3$SiMe$_2$(OSiMe$_2)_{35-45}$$(CH_2)_3$—NH—CO—NH—$C_3H_6$—Si(OCH$_3)_3$, $(C_2H_5O)_3$—Si—$CH_2$—NH—CO [NH—$(CH_2)_3$—Si$(CH_3)_2$—(O—Si$(CH_3)_2)_{35-45}$—$(CH_2)_3$—NH—CO—NH-p-$C_6H_{10}$—$CH_2$-p-$C_6H_{10}$—NH—CO$]_{40-70}$—NH$(CH_2)_3$SiMe$_2$(OSiMe$_2)_{35-45}$-$(CH_2)_3$—NH—CO—NH—$CH_2$—Si(OC$_2$H$_5)_3$, $(H_5C_2O)_3$—Si—$C_3H_6$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{35-45}$—$(CH_2)_3$—NH—CO—NH-p-$C_6H_{10}$—$CH_2$-p-$C_6H_{10}$—NH—CO$]_{40-70}$—[NH—$(CH_2)_3$—Si$(CH_3)_2$—(O—Si$(CH_3)_2)_{35-45}$—$(CH_2)_3$—NH—CO—NH-p-$C_6H_{10}$—$CH_2$-p-$C_6H_{10}$—NH]—CO—NH—$C_3H_6$—Si(OC$_2$H$_5)_3$, $(H_5C_2O)_3$—Si—$CH_2$—NH—CO—NH-p-$C_6H_{10}$—$CH_2$-p-$C_6H_{10}$—NH—CO—[NH—$(CH_2)_3$—Si$(CH_3)_2$—(O—Si$(CH_3)_2)_{35-45}$—$(CH_2)_3$—NH—CO—NH-p-$C_6H_{10}$—$CH_2$- p-C$_6$H$_{10}$—NH—CO]$_{40-70}$—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH]—CO—NH—CH$_2$—Si(OC$_2$H$_5$)$_3$, (H$_3$CO)$_3$—Si—C$_3$H$_6$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH—CO]$_{40-70}$—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH]—CO—NH—C$_3$H$_6$—Si(OCH$_3$)$_3$,

H$_3$C(H$_3$CO)$_2$—Si—C$_3$H$_6$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH—CO]$_{40-70}$—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH]—CO—NH—C$_3$H$_6$—Si(OCH$_3$)$_2$CH$_3$, n-C$_4$H$_9$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NH—CO]$_{40-70}$—[NH—(CH$_2$)$_3$—Si(CH$_3$)$_2$—(O—Si(CH$_3$)$_2$)$_{35-45}$—(CH$_2$)$_3$—NH—CO—NH-p-C$_6$H$_{10}$—CH$_2$-p-C$_6$H$_{10}$—NCO, (C$_2$H$_5$O)$_3$—Si—C$_3$H$_6$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—NH(CH$_2$)$_3$SiMe$_2$(OSiMe$_2$)$_{35-45}$(CH$_2$)$_3$—NH—CO—NH—C$_3$H$_6$—Si(OC$_2$H$_5$)$_3$, (C$_2$H$_5$O)$_3$—Si—CH$_2$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—NH(CH$_2$)$_3$SiMe$_2$(OSiMe$_2$)$_{35-45}$(CH$_2$)$_3$—NH—CO—NH—CH$_2$—Si(OC$_2$H$_5$)$_3$, (H$_3$CO)$_3$—Si—C$_3$H$_6$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—NH(CH$_2$)$_3$SiMe$_2$(OSiMe$_2$)$_{35-45}$(CH$_2$)$_3$—NH—CO—NH—C$_3$H$_6$—Si(OCH$_3$)$_3$, (H$_3$CO)$_3$—Si—C$_3$H$_6$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—[NH—C$_6$H$_{12}$—NH—CO—NH—C$_{10}$H$_{18}$—NH—CO]$_{5-10}$—NH(CH$_2$)$_3$SiMe$_2$(OSiMe$_2$)$_{35-45}$-(CH$_2$)$_3$—NH—CO—NH—C$_3$H$_6$—Si(OCH$_3$)$_3$, (H$_3$CO)$_3$—Si—C$_3$H$_6$—NH—CO—NH—C$_{10}$H$_{18}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH]—CO—NH—C$_3$H$_6$—Si(OCH$_3$)$_3$,

H$_3$C(H$_3$CO)$_2$—Si—C$_3$H$_6$—NH—CO—NH—C$_{10}$H$_{18}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO—NH—C$_3$H$_6$—Si(OCH$_3$)$_2$CH$_3$, (H$_5$C$_2$O)$_3$—Si—C$_3$H$_6$—NH—CO—NH—C$_{10}$H$_{18}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO]$_{25-35}$—NH—(CH$_2$)$_3$—Si(CH$_3$)$_2$—(O—Si(CH$_3$)$_2$)$_{35-45}$—(CH$_2$)$_3$—NH—CO—NH—C$_{10}$H$_{18}$—NH—CO—NH—C$_3$H$_6$—Si(OC$_2$H$_5$)$_3$, (C$_2$H$_5$O)$_3$—Si—C$_3$H$_6$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH(CH$_2$)$_3$SiMe$_2$(OSiMe$_2$)$_{35-45}$(CH$_2$)$_3$—NH—CO—NH—C$_3$H$_6$—Si(OC$_2$H$_5$)$_3$, (C$_2$H$_5$O)$_3$—Si—CH$_2$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH(CH$_2$)$_3$SiMe$_2$(OSiMe$_2$)$_{35-45}$(CH$_2$)$_3$—NH—CO—NH—CH$_2$—Si(OC$_2$H$_5$)$_3$, (H$_3$CO)$_3$—Si—C$_3$H$_6$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH(CH$_2$)$_3$SiMe$_2$(OSiMe$_2$)$_{35-45}$(CH$_2$)$_3$—NH—CO—NH—C$_3$H$_6$—Si(OCH$_3$)$_3$, (H$_3$CO)$_3$—Si—C$_3$H$_6$—NH—CO—NH—C$_6$H$_{12}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO—NH—C$_3$H$_6$—Si(OCH$_3$)$_3$,

H$_3$C(H$_3$CO)$_2$—Si—C$_3$H$_6$—NH—CO—NH—C$_6$H$_{12}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO—NH—C$_3$H$_6$—Si(OCH$_3$)$_2$CH$_3$, (H$_5$C$_2$O)$_3$—Si—C$_3$H$_6$—NH—CO—NH—C$_6$H$_{12}$—NH—CO—[NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO]$_{25-35}$—NH—(CH$_2$)$_3$—Si(CH$_3$)$_2$—(O—Si(CH$_3$)$_2$)$_{35-45}$—(CH$_2$)$_3$—NH—CO—NH—C$_6$H$_{12}$—NH—CO—NH—C$_3$H$_6$—Si(OC$_2$H$_5$)$_3$, (C$_2$H$_5$O)$_3$—Si—C$_3$H$_6$—NH—CO—[NH—(CH$_2$)$_3$—Si(CH$_3$)$_2$—(O—Si(CH$_3$)$_2$)$_{130-155}$—(CH$_2$)$_3$—NH—CO—NH-p-C$_6$H$_{10}$—CH$_2$-p-C$_6$H$_{10}$—NH—CO]$_{10-20}$—NH(CH$_2$)$_3$SiMe$_2$(OSiMe$_2$)$_{130-155}$(CH$_2$)$_3$—NH—CO—NH—C$_3$H$_6$—Si(OC$_2$H$_5$)$_3$, (C$_2$H$_5$O)$_3$—Si—CH$_2$—NH—CO—[NH—(CH$_2$)$_3$—Si(CH$_3$)$_2$—(O—Si(CH$_3$)$_2$)$_{130-155}$—(CH$_2$)$_3$—NH—CO—NH-p-C$_6$H$_{10}$—CH$_2$-p-C$_6$H$_{10}$—NH—CO]$_{8-20}$—NH(CH$_2$)$_3$SiMe$_2$(OSiMe$_2$)$_{130-155}$(CH$_2$)$_3$—NH—CO—NH—CH$_2$—Si(OC$_2$H$_5$)$_3$, (C$_2$H$_5$O)$_3$—Si—C$_3$H$_6$—NH—CO—[NH—(CH$_2$)$_3$—Si(CH$_3$)$_2$—(O—Si(CH$_3$)$_2$)$_{130-155}$—(CH$_2$)$_3$—NH—CO—NH-p-C$_6$H$_{10}$—CH$_2$-p-C$_6$H$_{10}$—NH—CO]$_{8-20}$—[NH—CH$_2$—CH$_2$—NH—CO—NH-p-C$_6$H$_{10}$—CH$_2$-p-C$_6$H$_{10}$—NH—CO]$_{3-8}$—NH(CH$_2$)$_3$SiMe$_2$(OSiMe$_2$)$_{130-155}$(CH$_2$)$_3$—NH—CO—NH—C$_3$H$_6$—Si(OC$_2$H$_5$)$_3$, (C$_2$H$_5$O)$_3$—Si—CH$_2$—NH—CO—[NH—(CH$_2$)$_3$—Si(CH$_3$)$_2$—(O—Si(CH$_3$)$_2$)$_{130-155}$—(CH$_2$)$_3$—NH—CO—NH-p-C$_6$H$_{10}$—CH$_2$-p-C$_6$H$_{10}$—NH—CO]$_{8-20}$—[NH—CH$_2$—CH$_2$—NH—CO—NH-p-C$_6$H$_{10}$—CH$_2$-p-C$_6$H$_{10}$—NH—CO]$_{3-8}$—NH(CH$_2$)$_3$SiMe$_2$(OSiMe$_2$)$_{130-155}$(CH$_2$)$_3$—NH—CO—NH—CH$_2$—Si(OC$_2$H$_5$)$_3$, n-C$_4$H$_9$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{120-155}$—(CH$_2$)$_3$—NH—CO—NH-p-C$_6$H$_{10}$—CH$_2$-p-C$_6$H$_{10}$—NH—CO]$_{8-20}$—NH-n-C$_4$H$_9$, n-C$_4$H$_9$—NH—CO—NH—C$_{10}$H$_{18}$—NH—CO—[NH—(CH$_2$)$_3$—Si(CH$_3$)$_2$—(O—Si(CH$_3$)$_2$)$_{120-155}$—(CH$_2$)$_3$—NH—CO—NH—C$_{10}$H$_{18}$—NH—CO]$_{8-20}$—NH-n-C$_4$H$_9$, n-C$_4$H$_9$—NH—CO—NH—C$_6$H$_{12}$—NH—CO—[NH—(CH$_2$)$_3$—Si(CH$_3$)$_2$—(O—Si(CH$_3$)$_2$)$_{120-155}$—(CH$_2$)$_3$—NH—CO—NH—C$_6$H$_{12}$—NH—CO]$_{8-20}$—NH-n-C$_4$H$_9$, n-C$_4$H$_9$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{120-155}$

—(CH$_2$)$_3$—NH—CO—NH-p-C$_6$H$_{10}$—CH$_2$-p-C$_6$H$_{10}$—NH—CO]$_{8-20}$—[NH—(CH$_2$)$_3$—Si(CH$_3$)$_2$—(O—Si(CH$_3$)$_2$)$_{120-155}$—(CH$_2$)$_3$—NH—CO—NH—C$_{10}$H$_{18}$—NH—CO]$_{4-10}$NH-n-C$_4$H$_9$, n-C$_4$H$_9$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{120-155}$—(CH$_2$)$_3$—NH—CO—NH-p-C$_6$H$_{10}$—CH$_2$-p-C$_6$H$_{10}$—NH—CO]$_{8-20}$—NH—(CH$_2$)$_3$—Si(CH$_3$)$_2$—(O—Si(CH$_3$)$_2$)$_{120-155}$—(CH$_2$)$_3$—NH$_2$, n-C$_4$H$_9$—NH—CO—NH—C$_{10}$H$_{18}$—NH—CO—[NH—(CH$_2$)$_3$—Si(CH$_3$)$_2$—(O—Si(CH$_3$)$_2$)$_{120-155}$—(CH$_2$)$_3$—NH—CO—NH—C$_{10}$H$_{18}$—NH—CO]$_{8-20}$—NH—(CH$_2$)$_3$—Si(CH$_3$)$_2$—(O—Si(CH$_3$)$_2$)$_{120-155}$—(CH$_2$)$_3$—NH$_2$,

H—[NH—(CH$_2$)$_3$—Si(CH$_3$)$_2$—(O—Si(CH$_3$)$_2$)$_{120-155}$—(CH$_2$)$_3$—NH—CO—NH-p-C$_6$H$_{10}$—CH$_2$-p-C$_6$H$_{10}$—NH—CO]$_{8-20}$—[NH—(CH$_2$)$_3$—Si(CH$_3$)$_2$—(O—Si(CH$_3$)$_2$)$_{120-155}$—(CH$_2$)$_3$—NH$_2$,

H[NH—CH$_2$)$_3$—Si(CH$_3$)$_2$—(O—Si(CH$_3$)$_2$)$_{120-155}$—(CH$_2$)$_3$—NH—CO—NH—C$_6$H$_{12}$—NH—CO]$_{8-20}$—NH—(CH$_2$)$_3$—Si(CH$_3$)$_2$—(O—Si(CH$_3$)$_2$)$_{120-155}$—(CH$_2$)$_3$—NH$_2$ and n-C$_4$H$_9$—NH—CO—NH-p-C$_6$H$_{10}$—CH$_2$-p-C$_6$H$_{10}$—NH—CO—[NH—(CH$_2$)$_3$—Si(CH$_3$)$_2$—(O—Si(CH$_3$)$_2$)$_{120-155}$—(CH$_2$)$_3$—NH—CO—NH-p-C$_6$H$_{10}$—CH$_2$-p-C$_6$H$_{10}$—NH—CO]$_{8-20}$—[NH—(CH$_2$)$_3$—Si(CH$_3$)$_2$—(O—Si(CH$_3$)$_2$)$_{120-155}$—(CH$_2$)$_3$—NH—CO—NH—C$_{10}$H$_{18}$—NH—CO]$_{4-10}$NH—(CH$_2$)$_3$—Si(CH$_3$)$_2$—(O—Si(CH$_3$)$_2$)$_{120-155}$—(CH$_2$)$_3$—NH$_2$.

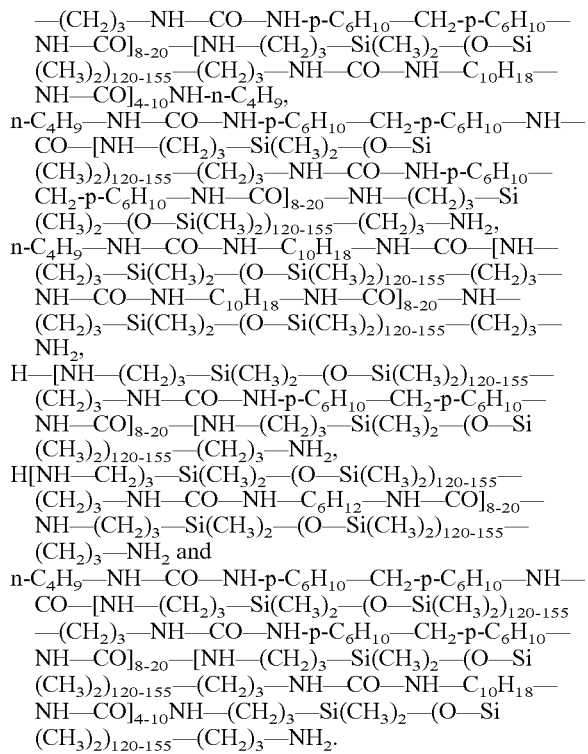

The proportion of the silicone copolymers (A) in the mixture according to the invention is preferably between 100 ppmw and 10,000 ppmw, more preferably between 250 ppmw and 6000 ppmw, and most preferably between 500 ppmw and 4000 ppmw.

The organic fibers (B) employed according to the invention are preferably cellulose-containing organic fibers, wherein organic fibers having a content of cellulose of 30% to 55% by weight are particularly preferred. The cellulose-containing organic fibers (B) are preferably cellulose-containing natural fibers, preferably of a vegetable origin, in particular wood.

Wood, which may be employed as component (B), preferably consists of 30% to 55% by weight of cellulose, 15% to 35% by weight of polyols and 15% to 35% by weight of lignin.

Organic fibers (B) employed according to the invention may assume any desired geometry but preference is given to fibers having a length/diameter ratio greater than 2 and more preferably greater than 4.

Examples of organic fibers (B) employed according to the invention are fibers from hard- or softwoods, for example maple, ash, cedar, pine and spruce, fibers from grasses or husks of fruits or from other fiber plants such as flax, cane sugar, groundnut plants, coconuts, sisal, bamboo, hemp and rice husks or fibers from processing residues from plant fibers, for example bagasse. Mixtures of the recited fiber types may likewise be used. The wood and natural fibers may also be generated as waste from industrial processes, for example the furniture, wood flooring or paper industry.

Also readily employable as component (B) employed according to the invention are wood wastes, for example bark, sawdust or lumber which must merely be selected with regard to color and particle size to influence the desired properties of the moldings to be produced therefrom.

When wood is employed as component (B) it is preferably selected from wood fibers or wood flour, more preferably compacted wood flour, and in particular compacted wood flour having a particle size of 150 μm to 500 μm.

Longer wood fibers influence the stiffness of the moldings but reduce the impact resistance thereof. The smaller particles do have a certain influence on stiffness but reduce the fracture resistance of the moldings. Due to the avoidance of wood flour dust it is preferable to employ compacted wood flour as component (B) according to the invention.

When wood is employed as component (B) the water content thereof is preferably 6% to 8% by weight but may be reduced by drying to a preferred range from 0.5% to 2.0% by weight. The wood to be used may optionally be comminuted into powder by grinding in ball mills or the like.

The proportion of the organic fibers (B) in the mixture according to the invention is preferably between 30% and 90% by weight, more preferably between 45% and 85% by weight, and in particular between 50% and 70% by weight.

The polymers (C) according to the invention may be any desired optionally substituted polymers known to date whose polymer backbone consists of carbon-carbon bonds.

Component (C) is preferably selected from optionally chlorine-, alkyl-, alkyl-carboxylate-, nitrile- or phenyl-substituted polyolefins, more preferably optionally chlorine- or methyl-substituted polyalkylenes.

Preferred monomers for producing component (C) are ethylene, propylene, vinyl chloride, vinyl acetate, methyl methacrylate, acrylonitrile, styrene, 1-butene, 1-hexene, 1-octene or butadiene or mixtures thereof, more preferably ethylene, propylene or vinyl chloride.

Examples of polymers (C) employed according to the invention are polyolefins, for example polyethylenes of low and high density (LDPE, LLDPE, HDPE), homo- and copolymers of propylene with for example ethylene, butene, hexene and octene (PP), olefin copolymers such as for example ethylene-methyl acrylate copolymer (EMA), polymethacrylates such as polymethyl methacrylate (PMMA), also polyvinylchloride (PVC) and polystyrenes (PS, HIPS, EPS) and styrene copolymers, for example polymers of acrylonitrile-butadiene-styrene (ABS), acrylic ester-acrylonitrile-styrene (ASA) and acrylonitrile-styrene (SAN), polymers of acrylonitrile-butadiene-methyl methacrylate-styrene (MABS), acrylonitrile-methyl methacrylate (ANNA), methyl acrylate-vinyl chloride (VC/MA) and methyl methacrylate-vinyl chloride (VC/MMA).

The polyolefins (C) employed according to the invention are preferably HDPE or polypropylene, more preferably polypropylene.

The substituted polyolefins (C) employed according to the invention are preferably polyvinylchloride (PVC) or polymethyl methacrylate, more preferably PVC.

The organic polymers (C) employed according to the invention are preferably thermoplastic, i.e. the temperature at which the loss factor (G"/G') according to DIN EN ISO 6721-2:2008 assumes the value 1 is preferably at least 40° C., more preferably at least 100° C.

The organic polymers (C) employed according to the invention preferably have an E-modulus (according to ISO 527) of greater than 1000 MPa.

The polymeric structure of the organic polymers (C) may be linear or branched.

The type of the organic polymers (C) employed substantially determines the processing temperature of the mixture according to the invention.

The proportion of the organic polymers (C) in the mixture according to the invention is preferably 10% to 70% by weight, more preferably 15% to 55% by weight, and most preferably 30% to 50% by weight.

The component (C) employed according to the invention is selected from products which are commercially available or can be produced by processes commonly used in chemistry.

It is preferable when both unsubstituted polyolefins and substituted polyolefins are employed as component (C). It is more preferable when a portion of the component (C) employed according to the invention is selected from polyolefins whose polymer backbone is partly substituted with acid anhydride groups, most preferably selected from polyolefins partly bearing maleic anhydride or succinic anhydride groups. Examples thereof are commercially available products of the Lotader®- and Orevac® product lines from ARKEMA SA (Colombes, France), products of the ADMER® family from Mitsui&Co Deutschland GmbH (Düsseldorf, Germany) or products of the SCONA® product range from BYK Kometra GmbH (Schkopau, Germany).

When as a portion of component (C), acid-anhydride-substituted polyolefins are employed, then these are preferably employed in amounts from 0.1% by weight to 5% by weight, more preferably in amounts of 0.5% by weight to 3% by weight and most preferably in amounts of 1% by weight to 2.5% by weight, in each case based on the total weight of the mixture according to the invention.

In addition to the components (A), (B) and (C) the mixtures according to the invention may also contain further substances, for example inorganic fibers (D), flame retardants (E), biocides (F), pigments (G), UV absorbers (H) and HALS stabilizers (I).

Examples of inorganic fibers (D) optionally employed according to the invention are glass fibers, basalt fibers or wollastonite, wherein glass fibers are preferred. When inorganic fibers (D) are employed, amounts are preferably 1% to 30% by weight, more preferably 5% to 15% by weight. The mixtures according to the invention preferably do not contain any component (D).

Examples of flame retardants (E) optionally employed according to the invention are organic flame retardants based on halogenated organic compounds or inorganic flame retardants, for example aluminum hydroxide (ATH) or magnesium hydroxide. When flame retardants (E) are employed inorganic flame retardants such as ATH are preferred.

Examples of biocides (F) optionally employed according to the invention are inorganic fungicides, such as borate, for example zinc borate, or organic fungicides, for example thiabendazole.

Examples of pigments (G) optionally employed according to the invention are organic pigments or inorganic pigments, for example iron oxide or titanium dioxide. When pigments (G) are employed, amounts are preferably 0.2% to 7% by weight, more preferably 0.5% to 3% by weight. It is preferable when pigments (G) are employed, in particular in the form of a premixture with component (C).

Examples of UV absorbers (H) optionally employed according to the invention are benzophenones, benzotriazoles or triazines. When UV absorbers (H) are employed benzotriazoles and triazines are preferred.

Examples of HALS stabilizers (I) optionally employed according to the invention are for example piperidine or piperidyl derivatives and are available inter alia under the brand name Tinuvin (BASF, Ludwigshafen, Germany).

The mixtures according to the invention are preferably those containing
(A) amorphous siloxane-organo copolymers of formula (1),
(B) organic fibers,
(C) both unsubstituted polyolefins and substituted polyolefins,
optionally (D) inorganic fibers,
optionally (E) flame retardants,
optionally (F) biocides,
optionally (G) pigments,
optionally (H) UV absorbers and
optionally (I) HALS stabilizers.

The mixtures according to the invention are more preferably those containing
(A) amorphous siloxane-organo copolymers of formula (1)
(B) wood fibers,
(C) both unsubstituted polyolefins and substituted polyolefins,
optionally (D) inorganic fibers,
optionally (E) flame retardants,
optionally (F) biocides,
(G) pigments,
optionally (H) UV absorbers and
optionally (I) HALS stabilizers.

In a further particularly preferred embodiment the mixtures according to the invention are those containing
(A) amorphous siloxane-organo copolymers of formula (1),
(B) wood fibers,
(C) both unsubstituted polyolefins and substituted polyolefins,
(F) biocides,
(G) pigments and
(H) UV absorbers.

The mixtures according to the invention preferably do not contain any further constituents beyond the components (A) to (I).

The individual constituents of the mixtures according to the invention may in each case be one type of such a constituent or else a mixture of at least two different types of such constituents.

The mixtures according to the invention may be produced by any desired processes known to date, for example mixing of the components in any desired sequence. Mixers or kneaders or extruders of the prior art may be used to this end.

The present invention further provides a process for producing the mixtures according to the invention by mixing the components (A), (B) and (C) and also optionally further components, preferably selected from the components (D) to (I), in any desired sequence.

The process according to the invention may be carried out in the presence or absence of solvent, wherein solvent-free production is preferred.

The process according to the invention may be performed continuously, discontinuously or semicontinuously, but preferably continuously.

The process according to the invention is preferably performed in continuously operated kneaders or mixers or extruders, wherein the individual components to be mixed according to the invention are each continuously supplied to the mixing apparatus by gravimetric or volumetric means either in pure form or as a premixture. Components present in the overall mixture in a proportion of less than 1% by weight are preferably supplied as a premixture in one of the components having a greater proportion.

The temperatures at which the process according to the invention is performed depend primarily on the employed components and are known to the person skilled in the art, with the proviso that they are below the specific decomposition temperatures of the individual components employed. The process according to the invention is preferably performed at temperatures below 250° C., more preferably in the range from 150° C. to 220° C.

The process according to the invention is preferably performed at the pressure of the ambient atmosphere, i.e. between 900 and 1100 hPa. However, it is also possible to use higher pressures which depend in particular on the employed mixing apparatus. Thus, the pressure is for example markedly greater than 1000 hPa in different regions of the kneader, mixer or extruder employed.

In a preferred embodiment of the process according to the invention component (A) is employed in a so-called masterbatch as a premixture with a portion of the organic polymer (C) and optionally one or more of the components (D) to (I). This premixture is preferably produced by mixing the components (A), (C) and optionally one or more of components (D) to (I) at temperatures between 140° C. and 230° C., wherein the mixing may be performed continuously, discontinuously or semicontinuously. The mixing operation may employ mixers, kneaders or extruders of the prior art.

The mixing of the components (A) and (C) is preferably performed continuously in an extruder or kneader of the prior art. This premixture preferably contains the copolymer (A) in an amount between 5% and 35% by weight, more preferably between 10% and 30% by weight, and most preferably between 15% and 25% by weight, in each case based on the weight of the premixture.

The premixture produced according to the invention is preferably present in granulate form or in powder form, but most preferably in granulate form. The granulate may also be processed into a powder by mechanical grinding or may be obtained as a microgranulate by means of a corresponding granulation plant.

In the process according to the invention the thus obtained premixture is then preferably continuously conveyed into a heatable mixer with the remaining portions of the component (C), component (F) and optionally one or more of the components (D) to (I). Components may be added to the mixer separately or may be added together. The mixing/homogenizing of the individual components is then preferably carried out at temperatures of 150° C. to 210° C., more preferably at 180° C. to 210° C.

After the mixing process of the individual components the composition according to the invention is then preferably discharged from the reactor via a nozzle as a hot, high-viscosity melt. In a preferred process the material is cooled with a cooling medium and subsequently comminuted/granulated after emerging. The cooling of the material and the granulating may be performed simultaneously via a underwater granulation or successively. Preferred cooling media employed are water or air. Preferred processes for granulation are underwater granulation, granulation by air cutting and strand granulation. The obtained granulates have a weight of preferably less than 0.5 g, more preferably less than 0.25 g, and in particular less than 0.125 g. The granulates obtained according to the invention are preferably cylindrical or spherical.

In a subsequent step the thus obtained granulates may be extruded to afford a molded article, preferably a profile, by means of a further thermoplastic processing operation. In a preferred process mode the compositions according to the invention are continuously conveyed into a kneader or extruder of the prior art in the form of a granulate, heated and plasticized in this kneader or extruder by the action of temperature and subsequently pressed through a nozzle which confers the desired profile shape. Thus, depending on the configuration of the nozzle either solid profiles or else hollow profiles may be manufactured here.

The invention further provides molded articles produced by extrusion of the mixtures according to the invention.

In a preferred embodiment the composition according to the invention is immediately continuously extruded via an appropriate nozzle as a profile which may then likewise be cut to length/cut to size.

The production of the composition according to the invention may employ mixers or kneaders or extruders of the prior art.

The obtained mixtures are preferably thermoplastic, i.e. the temperature at which the loss factor (G"/G') according to DIN EN ISO 6721-2:2008 assumes the value 1 is preferably at least 40° C., more preferably at least 100° C.

The obtained mixtures preferably have an E-modulus (according to ISO 527) of greater than 1000 MPa.

The mixtures according to the invention exhibit exceptional properties in terms of stiffness and a low water absorption, as a result of which the mixtures may especially be employed in exterior applications.

The mixtures according to the invention may be used wherever so-called WPC have hitherto been employed.

Preferred applications of the polymer mixtures according to the invention are uses as a constituent of profiles in the construction sector or as a compound for automobile interior applications.

The compositions according to the invention have the advantage that they are simple to produce.

The compositions according to the invention further have the advantage that they have a low water absorption.

The compositions according to the invention have the advantage that the mechanical properties of the finished mixture are improved through the addition of the siloxane-containing component (A).

The process according to the invention has the advantage that even at higher contents of organic fibres mechanical abrasion of the metallic mixer/extruder elements is strongly reduced.

In the examples described hereinbelow all reported viscosities relate to a temperature of 25° C. Unless otherwise stated the examples which follow are performed at a pressure of the ambient atmosphere, i.e. at approximately 1000 hPa, and at room temperature, i.e. at approximately 23° C., or at a temperature established on mixing the reactants at room temperature without additional heating or cooling and at a relative atmospheric humidity of approximately 50%. Furthermore, unless otherwise stated all reported quantities in parts and percentages relate to weight.

The following products are used in the examples:
Polymer C1: polypropylene having a melting point of 163° C. (commercially available as "PP HC205TF" from Borealis AG, Vienna, Austria);
Copolymer A1: amorphous urea-siloxane copolymer (commercially available as GENIOMER® 345 from Wacker Chemie AG, Munich, Germany); the temperature at which the loss factor (G"/G') according to ISO 6721-10 assumes the value 1 is 184° C. (measurement frequency 1 Hz, deformation 0.1%). The loss factor at 190° C. is 1.13;
Copolymer A2: semicrystalline urea-siloxane copolymer having a melting point of 161° C. (commercially available as GENIOMER® 200/50 from Wacker Chemie AG, Munich, Germany); the temperature at which the loss factor (G"/G') according to ISO 6721-10 assumes the value 1 is 163.5° C. (measurement frequency 1 Hz, deformation 0.1%). The loss factor at 190° C. is 7;

Polymer A3: amorphous silicone-containing additive based on a linear polydimethylsiloxane (commercially available as GENIOPLAST® Pellet P from Wacker Chemie AG, Munich, Germany);

PPA1: stearate-based processing aid (commercially available as "PHX369" from Chemson Polymer-Additive AG, Arnoldstein, Austria);

Fibre B1: wood fibers (commercially available as Lignocell C320 from JRS Rettenmaier & Söhne GmbH and Co. KG, Rosenberg, Germany);

Polymer C2: maleic-anhydride-functionalized polypropylene (commercially available as "Scona TPPP 8112 FA" from BYK Kometra GmbH, Schkopau, Germany);

Pigment 1: titanium dioxide (commercially available as "Titandioxid K 2450" from Kronos International, Leverkusen, Germany);

Pigment 2: iron oxide (commercially available as Bayferrox® 360 from Lanxess, Leverkusen, Germany).

Example 1 (Production of Masterbatch I)

1.00 kg of copolymer A1 was mixed with 9.00 kg of polymer C1, in granulate form in each case, and compounded in a ZK 25 counterrotating twin-screw extruder from Collin (Ebersberg, Germany) at a temperature of 220° C. The temperature in the intake region (zone 1) was 100° C. and was increased to 180° C. in zone 2 and 220° C. in zone 3. Zone 4 and zone 5 were likewise at 220° C. and the nozzle was temperature controlled to 210° C. The mixture was extruded as a strand which was subsequently granulated. The discharge rate was 2.2 kg/h. This afforded 9.85 kg of masterbatch I having a content of copolymer A1 of 10% by weight.

Example 2 (Production of Masterbatch II)

1.00 kg of copolymer A2 was mixed with 9.00 kg of polymer C1, in granulate form in each case, and compounded in a ZK 25 counterrotating twin-screw extruder from Collin at a temperature of 220° C. The temperature in the intake region (zone 1) was 100° C. and was increased to 180° C. in zone 2 and 220° C. in zone 3. Zone 4 and zone 5 were likewise at 220° C. and the nozzle was temperature controlled to 210° C. The mixture was extruded as a strand which was subsequently granulated. The discharge rate was 2.2 kg/h. This afforded 9.72 kg of masterbatch I having a content of copolymer A2 of 10% by weight.

Examples 3-12 (Inventive Examples 4, 5 and 6)

Wood fiber compounds were produced with the components recited in table 1 in the amounts reported therein (in kilograms in each case). The reported components were in each case independently of one another gravimetrically metered into zone 1 of a ZSK 26 Mc corotating twin-screw kneader from Coperion (Stuttgart, Germany). The temperature of zone 1 was 195° C., the temperature of zone 2 was 190° C., the temperature of zone 3 was 190° C., the temperature of zone 4 was 185° C. and the temperature of zone 5 was likewise 185° C. The nozzle temperature was 190° C. Immediately after emerging from the nozzle the obtained polymer melt was granulated using a plant for underwater granulation from Econ (Weisskirchen/Traun, Austria) at a cooling water temperature of 18° C. The discharge rate of the polymer mixture was 15 kg/h.

TABLE 1

| | Example | | | | | | | | | |
|---|---|---|---|---|---|---|---|---|---|---|
| | 3 | 4 | 5 | 6 | 7 | 8 | 9 | 10 | 11 | 12 |
| Masterbatch I | | 1 | 5 | 8 | | | | | | |
| Masterbatch II | | | | | 1 | 5 | 8 | | | |
| Polymer A3 | | | | | | | | 0.5 | 1 | |
| PPA1 | | | | | | | | | | 2 |
| Polymer C1 | 38 | 37 | 33 | 30 | 37 | 33 | 30 | 37.5 | 37 | 36 |
| Fiber B1 | 60 | 60 | 60 | 60 | 60 | 60 | 60 | 60 | 60 | 60 |
| Polymer C2 | 2 | 2 | 2 | 2 | 2 | 2 | 2 | 2 | 2 | 2 |
| Sum of individual components | 100 | 100 | 100 | 100 | 100 | 100 | 100 | 100 | 100 | 100 |
| Isolated granulate amount | 97.2 | 98.3 | 98.4 | 99.0 | 98.2 | 97.9 | 98.1 | 96.4 | 98.2 | 97.8 |

Examples 13-22 (Inventive Examples 14, 15 and 16)

The polymer mixtures obtained in examples 3-12 were gravimetrically metered into zone 1 of a counterrotating twin-screw extruder (battenfeld cincinnati Austria, Fiberex K38) at 20 kg/h. The temperature of zone 1 was 195° C., the temperature of zone 2 was 170° C., the temperature of zone 3 was 180° C., the temperature of zone 4 was 180° C. and the temperature of zone 5 was likewise 180° C. The nozzle temperature was 190° C. The extruder speed was 20 rpm. The melt temperature was in each case about 190° C. After emerging from the nozzle the obtained polymer melt was extruded as a profile having a width of 80 mm and a height of 25 mm, cooled to 32° C. on a cooling belt and cut to size.

TABLE 2

| | Example | | | | | | | | | |
|---|---|---|---|---|---|---|---|---|---|---|
| | 13 | 14 | 15 | 16 | 17 | 18 | 19 | 20 | 21 | 22 |
| | Compound from example | | | | | | | | | |
| | 3 | 4 | 5 | 6 | 7 | 8 | 9 | 10 | 11 | 12 |
| Extrusion parameters (Target <130 Wh/kg) | | | | | | | | | | |
| Spec. power [Wh/kg] | 136 | 127 | 115 | 112 | 121 | 115 | 105 | 136 | 130 | 114 |
| Extruder loading [%] | 43 | 39 | 35.5 | 35.3 | 38.1 | 36.4 | 33 | 43 | 41 | 35.3 |
| Melt temperature in ° C. | 192 | 191 | 198 | 188 | 186 | 187 | 187 | 191 | 190 | 190 |
| Mechanics | | | | | | | | | | |
| Flexural E-modulus [MPa] | 3700 | 4100 | 3700 | 3400 | 2350 | 2200 | 2150 | 3600 | 3300 | 3050 |
| Flexural strength [MPa] | 58 | 63 | 57 | 50 | 30 | 29 | 28 | 58 | 57 | 42 |
| Impact resistance [N/mm$^2$] | 8.5 | 10 | 9.3 | 7.5 | 4.4 | 4.4 | 4 | 8 | 9.6 | 5.9 |
| Water absorption (Target ≤15%) | | | | | | | | | | |
| 28 days storage [%] | 14.9 | 14.9 | 15 | 14.9 | 31 | 36 | 37 | 19 | 17 | 22 |

Examples 23-28 (Inventive Examples 25 to 28)

Wood fiber compounds were produced with the components recited in table 3 in the amounts reported therein (in kilograms in each case). The reported components were in each case independently of one another gravimetrically metered into zone 1 of a ZSK 26 Mc corotating twin-screw kneader from Coperion (Stuttgart, Germany). The temperature of zone 1 was 195° C., the temperature of zone 2 was 190° C., the temperature of zone 3 was 190° C., the temperature of zone 4 was 185° C. and the temperature of zone 5 was likewise 185° C. The nozzle temperature was 190° C. Immediately after emerging from the nozzle the obtained polymer melt was granulated using a plant for underwater granulation from Econ (Weisskirchen/Traun, Austria) at a cooling water temperature of 18° C. The discharge rate of the polymer mixture was 15 kg/h.

TABLE 3

| | Example | | | | | |
|---|---|---|---|---|---|---|
| | 23 | 24 | 25 | 26 | 27 | 28 |
| Masterbatch I | | | 3 | 3 | 3 | 3 |
| Polymer C1 | 38 | 38 | 35 | 35 | 35 | 35 |
| Fiber B1 | 58 | 58 | 58 | 58 | 59 | 59 |
| Polymer C2 | 2 | 2 | 2 | 2 | 2 | 2 |
| Pigment 1 | 2 | | 2 | | 1 | |
| Pigment 2 | | 2 | | 2 | | |
| Sum of individual components | 100 | 100 | 100 | 100 | 100 | 100 |

TABLE 3-continued

| | Example | | | | | |
|---|---|---|---|---|---|---|
| | 23 | 24 | 25 | 26 | 27 | 28 |
| Isolated granulate amount | 98.3 | 98.1 | 98.5 | 97.2 | 97.2 | 98.9 |
| Pellet colour | white | grey-black | white | grey-black | white | grey-black |

Examples 29-34 (Inventive Examples 31 to 34)

The polymer mixtures obtained in examples 23-28 were gravimetrically metered into zone 1 of a counterrotating twin-screw extruder (battenfeld cincinnati Austria, Fiberex K38) at 20 kg/h. The temperature of zone 1 was 195° C., the temperature of zone 2 was 170° C., the temperature of zone 3 was 180° C., the temperature of zone 4 was 180° C. and the temperature of zone 5 was likewise 180° C. The nozzle temperature was 190° C. The extruder speed was 20 rpm. The melt temperature was in each case about 190° C. After emerging from the nozzle the obtained polymer melt was extruded as a colored profile having a width of 80 mm and a height of 25 mm, cooled to 32° C. on a cooling belt and cut to size.

TABLE 4

| | Example | | | | | |
|---|---|---|---|---|---|---|
| | 29 | 30 | 31 | 32 | 33 | 34 |
| | Compound from Example | | | | | |
| | 23 | 24 | 25 | 26 | 27 | 28 |
| Extrusion parameters (Target <130 Wh/kg) | | | | | | |
| Spec. power [Wh/kg] | 135 | 136 | 114 | 115 | 113 | 115 |
| Extruder loading [%] | 43 | 43 | 35.6 | 35.3 | 34.8 | 35.4 |
| Melt temperature in ° C. | 192 | 191 | 187 | 188 | 186 | 187 |
| Mechanics | | | | | | |
| Flexural E-modulus [MPa] | 3550 | 3580 | 3700 | 3720 | 3680 | 3650 |
| Flexural strength [MPa] | 57 | 56 | 60 | 61 | 62 | 61 |
| Impact resistance [N/mm$^2$] | 8.3 | 8.6 | 9.4 | 9.5 | 9.2 | 9.3 |
| Water absorption (Target ≤15%) | | | | | | |
| 28 days storage [%] | 15 | 14.9 | 15 | 14.9 | 15.1 | 14.8 |

The flexural properties were each determined according to EN ISO 178. The test velocity was 3 mm/min, the number of measured specimens was 6, the specimen size was 80 mm×10 mm×4 mm.

The Charpy impact strength (unnotched) was determined according to EN ISO 179. The pendulum had an impact energy of 0.5 J. The number of measured specimens was 10. The specimen size was 80 mm×10 mm×4 mm.

To determine water absorption in each case 2 samples having dimensions of 50 mm×50 mm×4 mm were stored in DM water such that they were completely surrounded by water at a temperature of 20±2° C. and an immersion time of 28 days. Before commencement of water storage the samples were in each case dried in a drying cabinet at 80° C. for 72 hours. After the immersion time mentioned above the samples were taken out of the water bath and the water blotted from the surface. Water absorption is calculated by forming the quotient of the weight increase after water storage and the original weight before water storage.

The mixtures of inventive examples 4 and 5 and 6/14, 15 and 16/25 to 28 are the only polymer/natural fiber compounds which exhibit a strong reduction in power consumption during extrusion while simultaneously maintaining low water absorption and acceptable mechanical parameters.

The invention claimed is:

1. A thermoplastic, extrudable mixture comprising:
(A) at least one amorphous siloxane-organo copolymer having 10 to 3000 siloxane units per siloxane segment and at least one organo segment having at least one group selected from ester groups, amide groups, urethane groups, urea groups and thiourea groups,
(B) organic fibers, and
(C) optionally substituted polyolefins, wherein component (B) organic fibers are wood fibers.

2. A thermoplastic, extrudable mixture comprising:
(A) at least one amorphous siloxane-organo copolymer having 10 to 3000 siloxane units per siloxane segment and at least one organo segment having at least one group selected from ester groups, amide groups, urethane groups, urea groups and thiourea groups,
(B) organic fibers, and
(C) optionally substituted polyolefins, wherein component (B) organic fibers are wood fibers, and wherein the content of diorganylsiloxy units in component (A) is between 80% and 99% by weight.

3. A mixture comprising:
(A) at least one amorphous siloxane-organo copolymer having 10 to 3000 siloxane units per siloxane segment and at least one organo segment having at least one group selected from ester groups, amide groups, urethane groups, urea groups and thiourea groups,
(B) organic fibers, and
(C) optionally substituted polyolefins, and optionally one or more of components (D) through (I)
(D) inorganic fibers,
(E) flame retardants,
(F) biocides,
(G) pigments,
(H) UV absorbers, and
(I) HALS stabilizers, and no further components.

4. A mixture comprising:
(A) at least one amorphous siloxane-organo copolymer having 10 to 3000 siloxane units per siloxane segment and at least one organo segment having at least one group selected from ester groups, amide groups, urethane groups, urea groups and thiourea groups,
(B) organic fibers, and
(C) optionally substituted polyolefins, wherein component (A) comprises components of the formula (1)

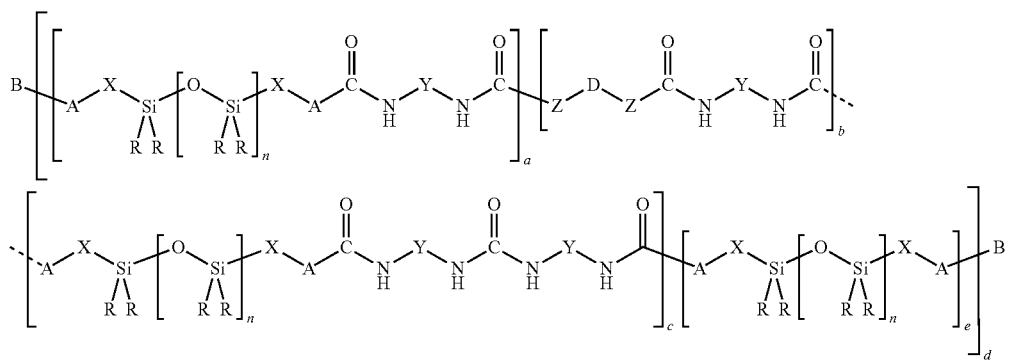

wherein
- R are identical or different and are monovalent, SiC-bonded, optionally fluorine- or chlorine-substituted hydrocarbon radicals having 1 to 20 carbon atoms,
- X are identical or different and are alkylene radicals having 1 to 20 carbon atoms in which nonadjacent methylene units are optionally replaced by —O— groups,
- A are identical or different and are oxygen, sulfur, or an amino group —NR'—,
- Z are identical or different and are oxygen, or an amino group —NR'—,
- R' are identical or different and are hydrogen or an alkyl radical having 1 to 10 carbon atoms,
- Y are identical or different and are divalent, optionally fluorine- or chlorine-substituted hydrocarbon radicals having 1 to 20 carbon atoms,
- D are identical or different and are divalent, optionally fluorine-, chlorine- or $C_1$-$C_6$-alkyl-ester-substituted hydrocarbon radicals in which nonadjacent methylene units are optionally replaced by —O—, —COO—, —OCO— or —OCOO— groups,
- B are identical or different and are hydrogen or a functional or nonfunctional organic or organosilicon radical,
- n each is identical or different and is a number from 10 to 3000,
- a is a number of at least 1,
- b is 0 or a number from 1 to 100,
- c is 0 or a number from 1 to 100,
- d is a number of at least 1 and
- e is 0 or 1.

5. The mixture of claim 4, wherein the content of diorganylsiloxy units in component (A) is between 80% and 99% by weight.

6. The mixture of claim 4, wherein the proportion of silicone copolymer(s) (A) in the mixture is between 100 ppmw and 10,000 ppmw based on the total weight of the mixture.

7. The mixture of claim 4, wherein component (B) organic fibers are wood fibers.

8. The mixture of claim 4, wherein the proportion of the organic fibers (B) in the mixture is between 30% and 90% by weight based on the total weight of the mixture.

9. The mixture of claim 4, wherein component (C) comprises at least one polymer selected from the group consisting of chlorine-substituted polyolefins, alkyl-substituted polyolefins, alkyl-carboxylate-substituted polyolefins, nitrile-substituted polyolefins, and phenyl-substituted polyolefins.

10. The mixture of claim 4, wherein the proportion of the optionally substituted polyolefins (C) in the mixture is 10% to 70% by weight based on the total weight of the mixture.

11. The mixture of claim 4, wherein the proportion of silicone copolymer(s) (A) in the mixture is between 250 ppmw and 6,000 ppmw based on the total weight of the mixture.

12. The mixture of claim 4, wherein the proportion of silicone copolymer(s) (A) in the mixture is between 500 ppmw and 4,000 ppmw based on the total weight of the mixture.

13. A molded article produced by extrusion of a mixture of claim 4.

14. A process for producing a mixture of claim 4, comprising mixing the components (A), (B) and (C) and also optionally further components in any desired sequence.

15. The process of claim 14, wherein component (A) is employed as a premixture with a portion of the optionally substituted polyolefins (C) and optionally one or more of the components
- (D) inorganic fibers,
- (E) flame retardants,
- (F) biocides,
- (G) pigments,
- (H) UV absorbers, and
- (I) HALS stabilizers.

* * * * *